United States Patent [19]

Toepel

[11] Patent Number: 4,539,948
[45] Date of Patent: Sep. 10, 1985

[54] TWO-CYCLE DIESEL ENGINE AND METHOD FOR METHANOL AND LIKE FUEL OPERATION

[75] Inventor: Richard R. Toepel, Farmington Hills, Mich.

[73] Assignee: General Motors Corporation, Detroit, Mich.

[21] Appl. No.: 609,122

[22] Filed: May 11, 1984

[51] Int. Cl.³ .............................................. F02B 33/38
[52] U.S. Cl. ................................................. 123/65 BA
[58] Field of Search ............... 123/65 R, 65 BA, 1 A, 123/569, 65 VB, 180 EH, 559, 564

[56] References Cited

U.S. PATENT DOCUMENTS

| | | | |
|---|---|---|---|
| 2,022,094 | 11/1935 | Shoemaker et al. | 123/65 BA |
| 2,067,757 | 1/1937 | Fielden | 123/564 |
| 2,330,866 | 10/1943 | Camner | 123/65 BA |
| 2,891,524 | 6/1959 | Scheiterlein | 123/65 BA |
| 3,125,086 | 9/1961 | Fox et al. | 123/374 |
| 3,161,182 | 12/1964 | Albinson et al. | 123/65 BA |
| 3,187,728 | 6/1965 | Friddell | 123/1 R |
| 3,202,141 | 8/1965 | Lovell | 123/1 R |
| 3,400,695 | 9/1969 | Zaruba | 123/65 |
| 3,450,109 | 6/1969 | Gratzmuller | 123/27 A |
| 3,526,214 | 9/1970 | Kamo | 123/122 |
| 3,996,912 | 12/1976 | Dreisin et al. | 123/179 H |
| 4,028,892 | 6/1977 | Hinkle | 123/65 BA |
| 4,075,990 | 2/1978 | Ribeton | 123/119 C |
| 4,096,697 | 6/1978 | Treuil | 123/122 D |
| 4,123,997 | 11/1979 | Oswald et al. | 123/1 A |
| 4,216,744 | 8/1980 | Oswald et al. | 123/1 A |
| 4,383,507 | 5/1983 | Powell | 123/179 H |
| 4,387,676 | 6/1983 | Couceiro | 123/179 H |
| 4,399,786 | 8/1983 | Holmer | 123/301 |

OTHER PUBLICATIONS

Elimination of Combustion Difficulties in a Glow Plug-Assisted Diesel Engine Operated with Pure Ethanol and Water—Ethanol Mixtures, Tadashi Murayama et al., SAE Paper 830373, Detroit, Michigan, Feb. 28– Mar. 4, 1983.

Development of Detroit Diesel Allison 6V-92TA Methanol Fueled Coach Engine, R. R. Toepel et al., SAE Paper 831744, San Francisco, California, Oct. 31-Nov. 3, 1983.

Primary Examiner—Ira S. Lazarus
Assistant Examiner—R. S. Bailey
Attorney, Agent, or Firm—Robert J. Outland

[57] ABSTRACT

A two-stroke cycle blower charged diesel engine is adapted for compression ignition operation on methanol or other low cetane fuels by modifications primarily including means for limiting cylinder charging air to a low scavenge ratio that provides heating of the cylinder charge with exhaust residuals to a point where reliable compression ignition of injected methanol, or other, fuel occurs. Preferably, a reduced flow air supply system and a controlled blower bypass provide adequate cylinder charge temperatures for methanol autoignition. Glow plugs or other means may be included for starting and warm-up operation.

6 Claims, 5 Drawing Figures

TWO-CYCLE DIESEL ENGINE AND METHOD FOR METHANOL AND LIKE FUEL OPERATION

TECHNICAL FIELD

This invention relates to two-cycle diesel engines and to the compression ignition operation of such engines with methanol and other fuels of low ignition quality (low cetane rating). More particularly the invention involves the modification for and method of operating two-stroke cycle blower charged, and optionally turbocharged, diesel engines with autoignition of direct injected liquid methanol and like fuels.

BACKGROUND AND SUMMARY OF THE INVENTION

An extensive discussion of the background, development, features and application of an operating embodiment of the invention is described and illustrated in SAE Paper No. 831744 entitled "Development of Detroit Diesel Allison 6-V92TA Methanol Fueled Coach Engine" by R. R. Toepel, J. E. Bennethum, and R. E. Heruth, published in conjunction with the fuels and lubricants Meeting at San Francisco, Calif., on Oct. 31-Nov. 3, 1983. Reference to this paper is recommended for its detailed discussion of the subject matter subsequently described herein and the disclosure of this paper is hereby incorporated herein by reference.

In its broader aspects the invention provides a method of operation and means for operating two-stroke cycle (two-cycle) blower scavenged diesel engines on direct injected liquid methanol fuels, or other fuels of low ignition quality (low cetane), such as ethanol and similar alcohols.

In a specific embodiment the invention provides bypass blower means for controlling scavenging of the cylinders of a turbocharged two-cycle blower scavenged diesel engine to maintain charge temperatures high enough for compression ignition of injected methanol fuel by using the heat of exhaust residuals retained from the previous cycle to the extent required under varying operating conditions.

Other features of the invention include the provision of cylinder head mounted glow plugs for aiding ignition of direct injected methanol during starting; selection of a slightly increased piston compression ratio and slightly reduced blower drive speed together with a reduced flow turbocharger, as compared with the comparable diesel engine, for matching engine air system requirements; increased flow capacity injectors to provide the additional fuel rate required and a bypass blower air control system for maintaining the required charge temperatures.

These and other features of the invention will be more fully understood from the following description of a specific embodiment taken together with the accompanying drawings.

BRIEF DRAWING DESCRIPTION

DETAILED DESCRIPTION

Figure 1:
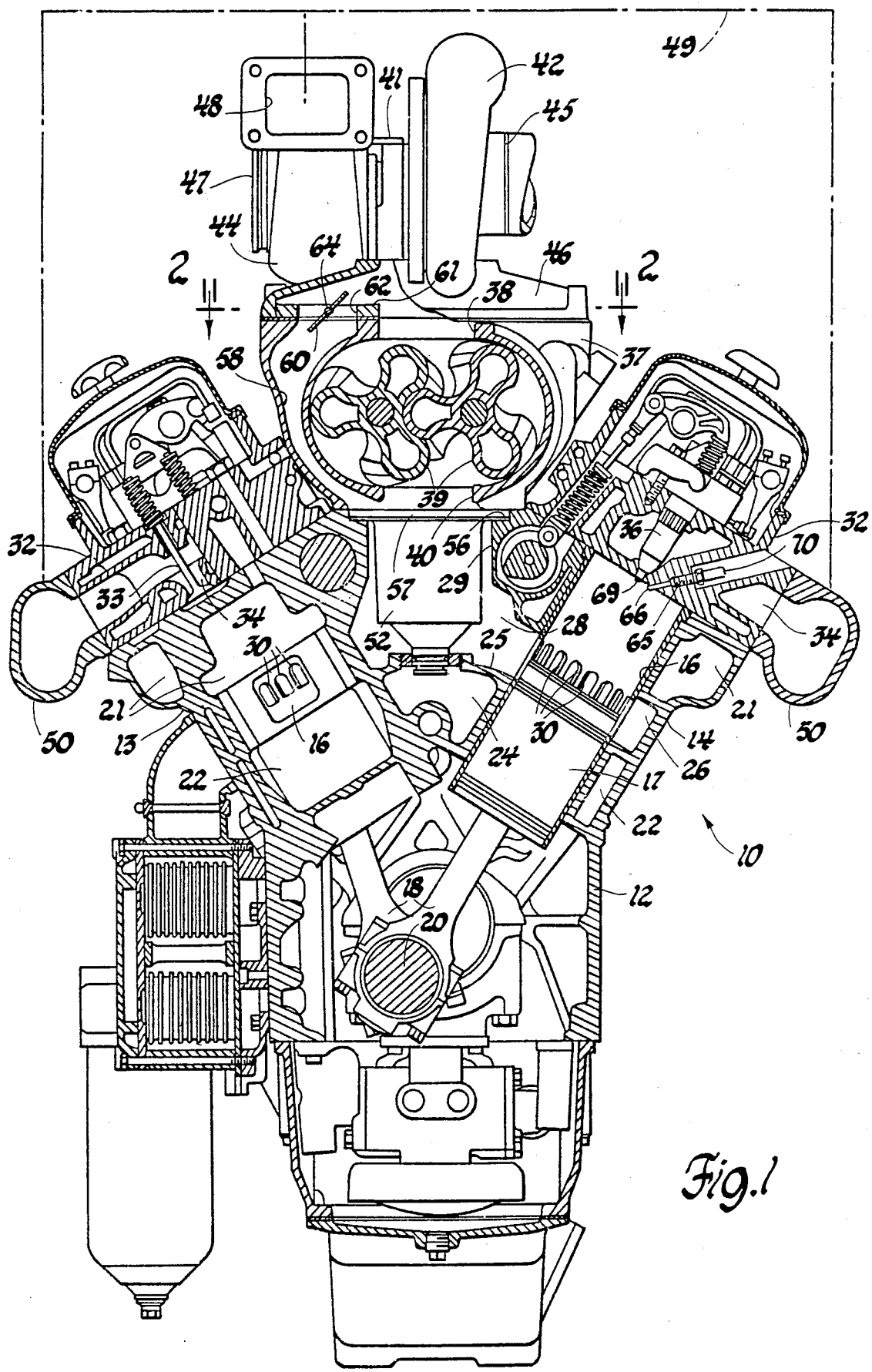
FIG. 1 is a transverse cross-sectional view of a two-cycle diesel engine adapted for methanol operation in accordance with the invention.
Figure 2:
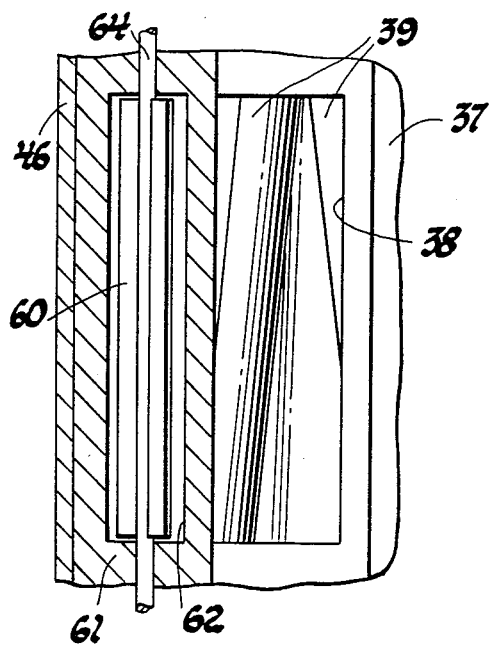
FIG. 2 is a cross-sectional view downwardly from the line 2—2 of FIG. 1 showing portions of the bypass blower construction.
Figure 3:
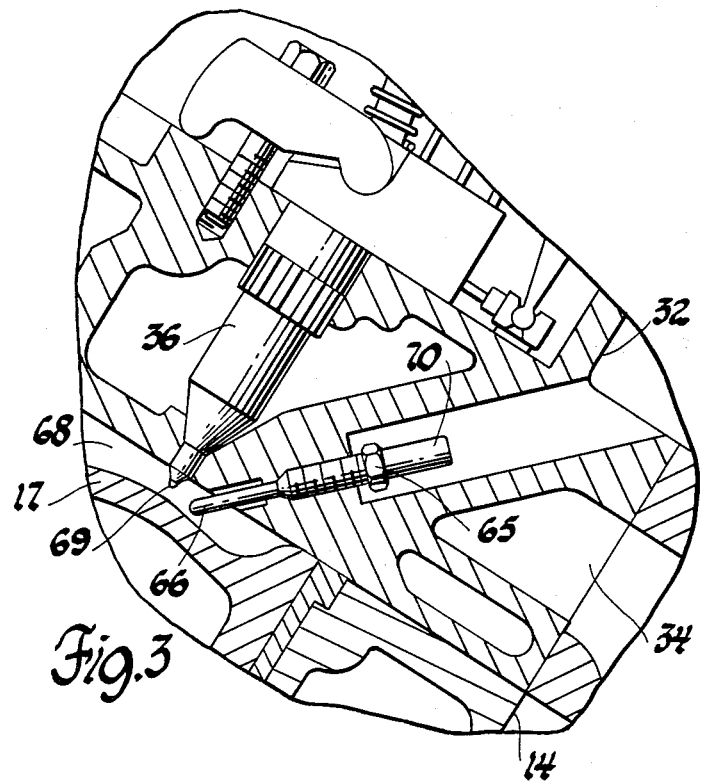
FIG. 3 is an enlarged view showing the mounting of a glow plug in the cylinder head of the engine shown in FIG. 1.

Referring first to FIGS. 1-3 of the drawings, there is represented an engine, generally indicated by numeral 10, of the multi-cylinder two-cycle diesel type. Engine 10 includes a cast cylinder block and crankcase 12 having a pair of cylinder banks 13, 14 arranged in a V, each bank being provided with a plurality of longitudinally aligned cylinders 16. A plurality of pistons 17 are reciprocably disposed, one in each cylinder, and connect through connecting rods 18 with a crankshaft 20, rotatably supported in conventional fashion in the lower, crankcase, portion of the block 12.

The cylinder block further defines upper and lower coolant jackets 21, 22 which respectively extend around the upper and lower portions of the cylinders and are interconnected for coolant flow therebetween. The central portion of the lower coolant jacket 22 extends between the cylinder banks to form a longitudinally extending central chamber 24, closed by an upper wall 25. The cylinder block also defines an inlet air chamber, or air box 26, outer portions of which extend around the centers of each of the cylinders between the upper and lower coolant jackets. An open central plenum 28 extends above wall 25 and connects the air box outer portions to an opening 29 in the top of the cylinder block between the two cylinder banks. Ports 30 are provided around the central portions of the cylinders to permit air to flow into the cylinders from the air box 26 as controlled by the motion of the pistons 17.

Each cylinder bank is provided with a cylinder head 32 mounted to close the upper ends of the cylinders of its respective bank and containing a plurality of exhaust valves 33, exhaust passages 34 controlled by the valves, and a fuel injector 36 for each cylinder. Actuation of the valves and injectors is conventionally controlled by valve gear operated in timed relation with the engine crankshaft.

A Roots-type positive displacement blower 37 is centrally mounted on the cylinder block between the engine cylinder heads. Blower 37 has an inlet opening 38 in the upper portion of its housing, lobed impellers 39 working in an enlarged central portion, and an outlet opening 40 in the lower portion of its housing and connecting with the air box inlet opening 29 of the cylinder block. A turbocharger 41 is also mounted on the engine by means, not shown, and includes a dynamic compressor portion 42 and a turbine portion 44. The compressor portion has an air inlet 45 adapted to be connected with an air source and an air outlet (not shown) connected by an air horn 46 with the inlet 38 of the Roots blower 37. The turbine portion includes an outlet 47 and an inlet 48 connected by suitable conduit 49 with exhaust manifolds 50 mounted on the engine cylinder heads and connecting with the exhaust passages 34 thereof.

Within the central plenum 28 of the engine air box there is received an aftercooler 52 supported within the cylinder block by a flange 56 secured within a recess 57 provided around the edge of the air box inlet opening 29. The aftercooler directs air delivered by the blower through vertical passages, not shown, in heat exchange relation to the engine coolant and directly into the central plenum 28 of the air box 26.

In accordance with the invention, the Roots blower 37, sometimes referred to as the bypass blower, is provided with a bypass passage 58 that extends within the blower housing around the central portion containing impellers 39. The passage 58 provides an alternate flow path around the impellers from the air horn 46 leading from the turbocharger compressor to the aftercooler 52 mounted in the engine air box. To control air flow through the bypass passage 58, a blade-type control valve or bypass valve 60 is located at the entrance to the passage 58 within the air horn 46. The valve 60 is supported by a valve plate 61 that is mounted on the blower housing above, and closing, the entrance to the passage 58. An opening 62 is provided in the valve plate which is closed or opened by oscillating movement of the control valve 60. The valve plate 61 is mounted on an oscillatory shaft 64 which is connected with external control means to be subsequently described.

Also in accordance with the invention, a glow plug 65 is mounted in each of the engine cylinder heads. The glow plug is of conventional construction and includes a tip portion 66 which, as is best shown in FIG. 3, extends into each engine cylinder 16 within the bowl 68 of its associated piston 17 (at its top dead center position) and near the tip 69 of the associated fuel injector 36. The glow plug 65 is connected through an electrical contact 70 with conventional means, not shown, for energizing and controlling operation of the glow plugs as required.

Figure 4:
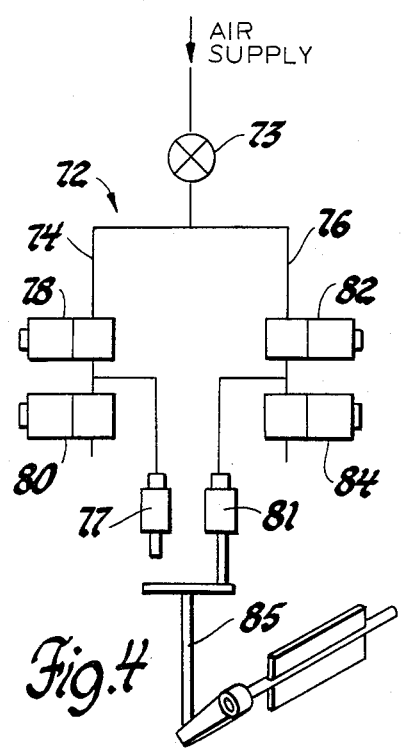
FIG. 4 is a schematic view showing the pneumatic circuit of the bypass blower control system for operating the blower bypass valve.

Referring now to FIG. 4 of the drawings, there is shown, schematically, a pneumatic actuating circuit generally indicated by numeral 72, forming part of a blower bypass control system for actuating the bypass valve 60. Circuit 72 includes a pressure regulator valve 73 which regulates air pressure received from a pressurized air supply, not shown, and distributes it to parallel portions 74, 76 of the actuating circuit 72. In portion 74, the supply of air pressure to an air cylinder 77 is controlled by a solenoid feeder valve 78 and a solenoid exhaust valve 80. In portion 76, the supply of pressure air to an air cylinder 81 is controlled by a solenoid feeder valve 82 and a solenoid exhaust valve 84.

A spring, not shown, biases the bypass control valve 60 toward its closed position. When cylinder 77 is pressurized, it engages linkage 85 connected with the shaft 64 to move the bypass valve 60 into an intermediate, partially open, position. When cylinder 81 is pressurized, it engages the linkage 85 to move the bypass valve 60 into its fully open position. The exhaust valves 80 and 84 are provided with larger orifices than their corresponding feeder valves 78, 82 so that opening of the exhaust valves bleeds off sufficient air to depressurize the connected cylinders and allow the spring to return the control valve to its closed position even though the feeder valves may be open.

Figure 5:
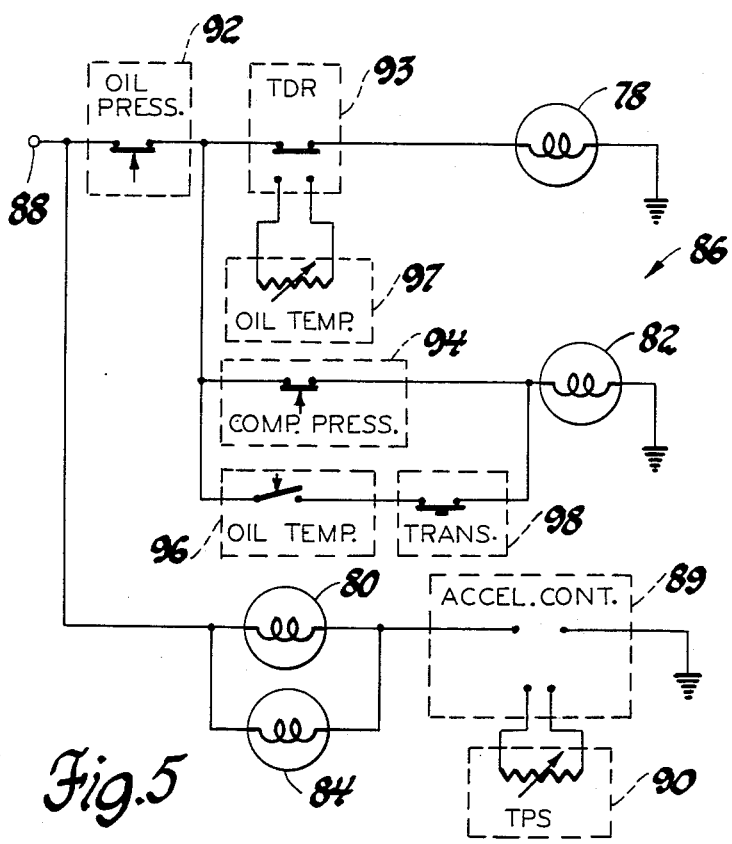
FIG. 5 is a schematic view illustrating the electrical circuit of the bypass blower control system for operating the solenoid valves of the blower bypass control.

Referring now to FIG. 5 of the drawings there is shown an electrical circuit generally indicated by numeral 86, forming part of the blower bypass control system and arranged to control operation of the pneumatic actuating circuit. Electric circuit 86 includes a connection from a 24 volt DC source 88 through the solenoids of solenoid exhaust valves 80, 84 and an acceleration controller 89 to ground. The acceleration controller 89 is connected with a throttle position sensor 90 and is operative to energize the solenoid valves 80, 84 whenever the rate of throttle position change indicates a rapid acceleration of the engine.

The circuit 86 further connects the electrical source 88 through an oil pressure switch 92 with a time delay relay 93, a compressor output pressure switch 94 and an oil temperature switch 96. Relay 93 provides a delay, after closing of the oil pressure switch 92 upon engine starting, before energizing the connected solenoid valve 78. The length of the time delay is determined by oil temperature sensed by an oil temperature sensor 97 connected with the relay 93. The oil temperature switch 96 connects with a transmission switch 98 to energize the solenoid valve 82 when both switches are closed. Alternatively, closure of the compressor pressure switch 94 will also energize solenoid valve 82.

OPERATION

In operation of the engine of FIGS. 1-3, rotation of the crankshaft 20 reciprocates the pistons 17 in the cylinders 16 and drives the Roots blower at a speed proportional to engine speed. This causes inlet air to be delivered through the aftercooler 52 and air box 26 to the cylinder inlet ports 30 where it enters the cylinders when their respective pistons approach their bottom dead center positions. At the same time the exhaust valves 33 are opened, allowing exhaust gases to pass through the exhaust conduit 49 to the turbocharger turbine portion to drive the turbocharger, thereby causing air to be drawn into the system and compressed in the compressor portion for delivery to the Roots blower 37.

Liquid methanol fuel is injected as atomized droplets into the ends of the cylinders by the injectors as the respective pistons approach their top dead center positions. This is accomplished in the same manner as for diesel fuel in conventional diesel engine systems, although differences in the volume of fuel and materials used in the fuel system may be required. The injected fuel will autoignite upon its dispersion into the heated charge of compressed air as long as the charge temperature after compression is sufficiently high. To assure meeting of this requirement, modifications to the air system of a commercial two-cycle diesel engine, including use of the bypass blower and control system, are utilized. Other methods of scavenging air control, such as throttling, might also be utilized. The glow plugs in the cylinders are provided for aiding ignition of the charge during engine starting and warm-up, as well as during operating conditions where the charge temperature is unusually low. Other means than glow plugs could be used if desired.

Discussion in the SAE Paper previously referred to indicates differences between the properties of methanol fuel and that of 2-D diesel fuel which affect compression ignition operation. These differences include a heating value for methanol less than half that of diesel fuel, a latent heat of vaporization approximately five times that of diesel fuel and a self-ignition temperature of about 878° F., compared to 600° F. for diesel fuel. The higher self-ignition temperature plus the greatly increased cooling effect of injected methanol fuel indicated, upon analysis, that the cylinder charge temperature required at beginning of injection to autoignite methanol must be between about 550° F. and 600° F. greater than that required to autoignite diesel fuel. To accommodate this and other requirements, certain changes from a conventional two-cycle diesel engine were determined to accommodate methanol fuel operation of an engine as installed in a passenger coach. In the described embodiment, the following characteristics were found to provide satisfactory operation.

1. The piston compression ratio was increased to 19:1, as compared to 17:1 compression ratio for a comparable engine operated on diesel fuel. The pistons used are standard for comparable non-turbocharged engines and provide easier starting as well as slightly better autoignition at lower speeds and power levels.

2. A comparably sized blower was driven at a 5 percent lower speed to reduce overall air flow through the engine. The blower bypass passage and control were added to further reduce air flow, as will be subsequently described.

3. A turbocharger having smaller air flow capacity matched to the modified air system was utilized.

4. The tips of the unit injectors were enlarged to provide increased flow capacity and allow injection of the required volumes of methanol fuel.

5. Retention of the standard aftercooler was found not to interfere with autoignition capability at high power outputs and actually to help at low power outputs, where the engine water temperature is higher than the charge temperature and therefore transfers heat to the charge.

6. Modified cylinder heads designed to accommodate the glow plugs were provided for cold starting and warm-up operation as previously mentioned.

To maintain the cylinder charge temperature at the beginning of injection above that level required for methanol autoignition, the engine of the present invention relies upon control of the scavenging air charge volume to vary, as required, the levels of exhaust residuals retained in the cylinders. In much of the engine operating range, this requires operation at a cylinder scavenge ratio of substantially less than 1.0. While this method has been applied and developed for use with methanol fuel on a turbocharged Roots blown engine, the concept should be equally well applicable to the use of other alcohol and low cetane fuels as well as to non-turbocharged Roots blown two-stroke cycle engines. Use in conjunction with diesel fuel in engines of very low compression ratio is also considered possible.

Since, in the present instance, the application for the methanol engine described was to replace a comparable diesel engine in a passenger carrying bus, it is for this application that the bypass blower control valve system illustrated in FIGS. 4 and 5 was developed. The operation of this system will now be discussed.

The bypass blower and turbocharger combination match the air flow requirements for autoignition over most of the load and speed range of the engine. However, at low engine speeds and loads where the turbocharger is essentially inactive, combustion air is only provided by the bypass blower.

A wide open blower bypass valve setting provides the desired scavenging characteristics when the turbocharger is operating but provides insufficient air flow at idle with the transmission in drive to provide the power needed to drive all of the coach (bus) accessory loads. Accordingly, an intermediate bypass valve position may be used either when the automatic transmission is shifted out of neutral or the air conditioning compressor clutch is engaged.

During cold starting greater air flow is needed to accommodate the required increase in fuel rate. The blower bypass is, therefore, closed during starting to provide the necessary air flow.

When accelerating a coach from rest at an acceptable rate with the engine initially running at idle, air flow is increased by closing the blower bypass valve when a rapid movement of the throttle in an increasing direction is sensed. The valve is kept closed for only about five to six seconds to provide greater air flow until the turbocharger responds to the increased fuel input.

The various open, intermediate and closed positions of the bypass valve 60 required to provide the above described actions are accomplished by the system of FIGS. 4 and 5 as follows. After the engine is started, the oil pressure switch 92 closes and relay 93 provides a time delay, dependent upon engine oil temperature, after which it closes, energizing solenoid valve 78. This delivers air pressure to cylinder 77, moving the bypass valve 60 to the intermediate position for idle operation with the transmission in drive.

When the vehicle is put in motion, an increase in the turbocharger compressor-out pressure above three inches of mercury closes the pressure switch 94, energizing the solenoid valve 82 and pressurizing cylinder 81 to move the valve 60 to the fully open position for normal running.

If the throttle is rapidly opened in the acceleration direction, the controller 89 energizes solenoid valves 80 and 84 for a limited period of five to six seconds. This exhausts air from the cylinders 77 and 81, allowing the bypass valve 60 to be closed by its biasing spring, thereby supplying extra air for a limited time to accommodate increased fuel flow until the turbocharger pressure builds up to supply the needed additional air.

During cold engine starting and the time delay thereafter until relay 93 closes, the solenoid feeder valves 78, 82 are deenergized and the valve 60 is closed to allow the blower to provide the needed air. Glow plugs are used to help ignite the charge under these conditions, since exhaust residuals are nonexistent, or limited in their effect on cylinder temperature. If desired, the glow plugs may also be used to assure good combustion performance under conditions of low engine speed, low engine temperature or low load, all of which may result in low charge temperatures that are borderline for the self-ignition of methanol. Normally, however, and under conditions of operation other than those indicated, the blower bypass remains open and scavenging air is delivered at a rate, dependent upon turbocharger delivery pressures and the system characteristics, which is sufficiently low to maintain engine charge temperatures at levels conductive to self-ignition of injected methanol but sufficiently great to provide complete combustion of the injected methanol.

Reference to the previously noted SAE paper will provide details of other features in the fuel system and glow plug controls as well as considerable background information relating to development of the vehicle passenger coach in which an engine according to the present invention was utilized.

While the invention has been described by reference to a specific embodiment for purposes of illustration, it should be understood that numerous changes may be made in the spirit and scope of the inventive concepts described. Accordingly it is intended that the invention not be limited to the described embodiment but that it have the full scope permitted by the language of the following claims.

The embodiments of the invention in which an exclusive property or privilege is claimed are defined as follows:

1. A two-stroke cycle diesel engine adapted for compression ignition operation on liquid fuels, said engine comprising
    a plurality of cylinders having pistons operable on a two-stroke cycle including compression and power strokes to supply power to an output member and permit through-flow cylinder scavenging at the end of each power stroke,
    an air supply blower connected to the cylinders to supply scavenging air thereto
    injection means to inject liquid fuel into each cylinder near the end of its piston compression stroke for compression ignition and burning of the fuel in a compressed charge, the compression ratio of the engine being inadequate in at least some portion of the normal operating range to raise a full cylinder charge of ambient air to a temperature capable of reliably igniting the injected fuel without substantial preheating or precompression of the cylinder charge, and
    means limiting the flow of scavenging air to the cylinders in at least a portion of the engine operating range to provide a cylinder scavenging ratio of sufficiently less than 1.0 to produce a heating effect of residual exhaust gases remaining in the cylinder that will raise the charge temperature to a point where reliable self-ignition of the fuel will occur substantially upon its injection into the compressed cylinder charge.

2. A two-stroke cycle diesel engine adapted for compression ignition operation on low cetane liquid fuels, said engine comprising
    a plurality of cylinders having pistons operable on a two-stroke cycle including compression and power strokes to supply power to an output member and permit through-flow cylinder scavenging at the end of each power stroke,
    an air supply blower connected to the cylinders to supply scavenging air thereto
    injection means to inject liquid fuel into each cylinder near the end of its piston compression stroke for compression ignition and burning of the fuel in a compressed charge, the compression ratio of the engine being inadequate under some conditions to raise a full cylinder charge of ambient air to a temperature capable of reliably igniting the injected fuel without substantial preheating or precompression of the cylinder charge, and
    non-restrictive means limiting the flow of scavenging air from the blower in at least a portion of the engine operating range to provide a cylinder scavenging ratio of sufficiently less than 1.0 that the heating effect of residual exhaust gases remaining in the cylinder will raise the charge temperature to a point where reliable self-ignition of the fuel will occur substantially upon its injection into the compressed cylinder charge.

3. A two-stroke cycle diesel engine adapted for compression ignition operation on liquid fuels, said engine comprising
    a plurality of cylinders having pistons operable on a two-stroke cycle including compression and power strokes to supply power to a crank and permit through-flow cylinder scavenging at the end of each power stroke,
    an air supply blower connected to the cylinders to supply scavenging air thereto
    injection means to inject liquid fuel into each cylinder near the end of its piston compression stroke for compression ignition and burning of the fuel in a compressed charge, the compression ratio of the engine being inadequate to raise a full cylinder charge of ambient air to a temperature capable of reliably igniting the injected fuel without substantial preheating or precompression of the cylinder charge, and
    means for varying the effective output of scavenging air from the blower in at least a portion of the engine operating range to provide a cylinder scavenging ratio sufficiently low that the heating effect of residual exhaust gases remaining in the cylinder will raise the charge temperature to a point where reliable self-ignition of the fuel will occur substantially upon its injection into the compressed cylinder charge.

4. A two-stroke cycle diesel engine adapted for compression ignition operation on low cetane liquid fuels, said engine comprising
    a plurality of cylinders having pistons operable on a two-stroke cycle including compression and power strokes to supply power to a crank and permit through-flow cylinder scavenging at the end of each power stroke,
    an air supply blower connected to the cylinders to supply scavenging air thereto
    injection means to inject liquid fuel into each cylinder near the end of its piston compression stroke for compression ignition and burning of the fuel in a compressed charge, the compression ratio of the engine being inadequate to raise a full cylinder charge of ambient air to a temperature capable of reliably igniting the injected fuel without substantial preheating or precompression of the cylinder charge, and
    blower bypass means operative to vary the effective output of scavenging air from the blower in at least a portion of the engine operating range to provide a cylinder scavenging ratio sufficiently low that the heating effect of residual exhaust gases remaining in the cylinder will raise the charge temperature to a point where reliable self-ignition of the fuel will occur substantially upon its injection into the compressed cylinder charge.

5. A two-stroke cycle diesel engine adapted for compression ignition operation on low cetane liquid fuels and/or at low compression ratios, said engine comprising
    a plurality of cylinders having pistons operable on a two-stroke cycle including compression and power strokes to supply power to a crank and permit through-flow cylinder scavenging at the end of each power stroke,
    an air supply blower having a positive displacement impeller and connected to the cylinder to supply scavenging air thereto
    injection means to inject liquid fuel into each cylinder near the end of its piston compression stroke for compression ignition and burning of the fuel in a compressed charge, the compression ratio of the engine being inadequate to raise a full cylinder charge of ambient air to a temperature capable of reliably igniting the injected fuel without substantial preheating or precompression of the cylinder charge, modulated blower bypass means operable to vary the flow of scavenging air from the blower and control means to modulate the bypass means to obtain a sufficient heating effect of residual exhaust gases remaining in the cylinder to provide cylinder charge temperatures adequate for reliable self-ignition of the fuel substantially upon its injection into the compressed cylinder charge.

6. A two-stroke cycle diesel engine adapted for compression ignition operation on low cetane liquid fuels, said engine comprising a plurality of cylinders having pistons operable on a two-stroke cycle including compression and power strokes to supply power to a crank and permit through-flow cylinder scavenging at the end of each power stroke, a turbocharger feeding an air supply blower having a positive displacement impeller and connected to the cylinders to supply scavenging air thereto injection means to inject liquid fuel into each cylinder near the end of its piston compression stroke for compression ignition and burning of the fuel in a compressed charge, glow plugs in the cylinders to aid ignition during starting and low temperature operation, modulating blower bypass means operable to vary the flow of scavenging air from the blower, and bypass control means operative to control the blower bypass means to maintain a fixed opening over a wide range of engine operation but to reduce the bypass opening for increased scavenging air flow during starting and acceleration conditions.

* * * * *